(12) United States Patent
Murase

(10) Patent No.: US 12,703,787 B2
(45) Date of Patent: Aug. 11, 2026

(54) RUBBER COMPOSITION FOR TIRE AND TIRE CONTAINING SAME

(71) Applicant: The Yokohama Rubber Co., LTD., Tokyo (JP)

(72) Inventor: Keisuke Murase, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 617 days.

(21) Appl. No.: 17/309,644

(22) PCT Filed: Dec. 16, 2019

(86) PCT No.: PCT/JP2019/049134
§ 371 (c)(1),
(2) Date: Jun. 11, 2021

(87) PCT Pub. No.: WO2020/129886
PCT Pub. Date: Jun. 25, 2020

(65) Prior Publication Data

US 2022/0017727 A1 Jan. 20, 2022

(30) Foreign Application Priority Data

Dec. 17, 2018 (JP) ................................ 2018-235358

(51) Int. Cl.
*C08L 7/00* (2006.01)
*B60C 1/00* (2006.01)
(Continued)

(52) U.S. Cl.
CPC .............. *C08L 7/00* (2013.01); *B60C 1/0016* (2013.01); *B60C 11/1236* (2013.01); *C08L 9/06* (2013.01); *B60C 2011/1254* (2013.01)

(58) Field of Classification Search
CPC . C08L 7/00; C08L 9/06; B60C 1/0016; B60C 11/1236; B60C 2011/1254
See application file for complete search history.

(56) References Cited

U.S. PATENT DOCUMENTS 10,087,313 B2 * 10/2018 Lizuka ...................... B60C 1/00
2006/0174987 A1 * 8/2006 Hirayama ............... B60C 11/00 152/209.5
(Continued)

FOREIGN PATENT DOCUMENTS

DE 11 2015 002 657 T5 2/2017
JP 2006-097024 A 4/2006
(Continued)

OTHER PUBLICATIONS

English machine translation of JP2016-044201. (Year: 2016).*
Data Sheet for Si75 (Year: 2023).*

*Primary Examiner* — Angela C Scott
(74) *Attorney, Agent, or Firm* — Thorpe North & Western, LLP

(57) ABSTRACT

A rubber composition for a tire is obtained by blending from 80 to 100 parts by mass of an inorganic filler and from 0.5 to 5 parts by mass of an alkylsilane having an alkyl group with from 3 to 20 carbons in 100 parts by mass of a diene rubber including from 20 to 45% by mass of a natural rubber, from 20 to 45% by mass of a styrene-butadiene rubber, and from 20 to 45% by mass of a butadiene rubber that add up to a total of 100% by mass, in which rubber hardness at 23° C. is 68 or more.

5 Claims, 3 Drawing Sheets

(51) Int. Cl.
*B60C 11/12* (2006.01)
*C08L 9/06* (2006.01)

(56) References Cited

U.S. PATENT DOCUMENTS

| | | | | |
|---|---|---|---|---|
| 2016/0263942 | A1* | 9/2016 | Tsuchida | C08L 9/00 |
| 2016/0297954 | A1* | 10/2016 | Sakaki | C08C 3/02 |
| 2017/0121494 | A1* | 5/2017 | Sato | C08K 5/548 |
| 2017/0362415 | A1* | 12/2017 | Lizuka | C08L 9/06 |
| 2019/0315965 | A1* | 10/2019 | Konishi | C08L 21/00 |

FOREIGN PATENT DOCUMENTS

| | | | | |
|---|---|---|---|---|
| JP | 2011-503308 A | 1/2011 | | |
| JP | 2013-018309 A | 1/2013 | | |
| JP | 2014-205842 A | 10/2014 | | |
| JP | 2015-054875 A | 3/2015 | | |
| JP | 2015-218255 A | 12/2015 | | |
| JP | 2016-044201 A | 4/2016 | | |
| JP | 2018-048294 A | 3/2018 | | |
| JP | 6321835 B1 * | 5/2018 | | B60C 1/00 |
| JP | 6329187 B | 5/2018 | | |
| WO | WO-2016088811 A1 * | 6/2016 | | B60C 1/00 |
| WO | 2018/002996 A1 | 1/2018 | | |
| WO | 2019/188804 A1 | 10/2019 | | |

* cited by examiner

RUBBER COMPOSITION FOR TIRE AND TIRE CONTAINING SAME

TECHNICAL FIELD

The present technology relates to a rubber composition for a tire with excellent dry steering stability performance, wet steering stability performance, low rolling resistance, and on-snow performance, and a tire including the composition.

BACKGROUND ART

All-season tires that are mounted on a high performance vehicle have been required to have high on-snow performance in addition to excellent dry steering stability performance and wet steering stability performance to enhance safety during high-speed driving and low rolling resistance to enhance fuel economy performance. However, it is difficult to provide these characteristics in a compatible manner to a high degree because these characteristics are contrary to each other. For example, when the rubber hardness of a rubber composition is decreased for the purpose of improving on-snow performance, the rigidity of the tread portion will be decreased, and the dry steering stability performance and the wet steering stability performance will be degraded. Moreover, the increased content of a butadiene rubber for lowering the glass transition temperature has the problems of decreasing the dispersibility of silica and deteriorating dry steering stability performance, wet steering stability performance, and low rolling resistance.

Japan Patent No. 6329187 describes that a tire for all seasons, which prioritizes wet grip performance, grip performance on ice, and low rolling resistance, is produced by a rubber composition which contains a natural rubber, a butadiene rubber, a styrene-butadiene rubber, silica, and a plasticizer and in which contents of these satisfy a special relationship formula. However, performance required by consumers for rubber compositions for tires for all seasons is even higher, and thus further enhancement has been demanded.

SUMMARY

The present technology provides a rubber composition for a tire having excellent dry steering stability performance, wet steering stability performance, low rolling resistance, and on-snow performance, and a tire including the composition.

A rubber composition for a tire according to an embodiment of the present technology that achieves the object mentioned above is a rubber composition obtained by blending from 80 to 100 parts by mass of an inorganic filler and from 0.5 to 5 parts by mass of an alkylsilane having an alkyl group with from 3 to 20 carbons in 100 parts by mass of a diene rubber containing from 20 to 45% by mass of a natural rubber, from 20 to 45% by mass of a styrene-butadiene rubber, and from 20 to 45% by mass of a butadiene rubber that add up to a total of 100% by mass, in which rubber hardness at 23° C. is 68 or more.

A tire according to an embodiment of the present technology is a tire including a tread portion formed from the above-described rubber composition for a tire, the tread portion being provided with four main grooves including a pair of inner main grooves and a pair of outer main grooves that extend in the tire circumferential direction, the main grooves defining a center land portion, a pair of intermediate land portions located outward of the center land portion, and a pair of shoulder land portions located outward of the intermediate land portions, in which the center land portion, the intermediate land portions, and the shoulder land portions are each provided with a plurality of sipes arranged at intervals in the tire circumferential direction, the sipes in the center land portion each include a widened portion formed with a large groove width at one end, the sipes in the shoulder land portions extend from an outer side of a ground contact end in a tire width direction toward the outer main groove, and the orientation of the sipes in the center land portion and the shoulder land portions with respect to the tire circumferential direction is opposite to the orientation of the sipes in the intermediate land portions.

The rubber composition for a tire according to an embodiment of the present technology achieves favorable dispersibility of the inorganic filler, allows the rubber hardness to be further increased, and allows obtaining a rubber composition for a tire with excellent dry steering stability performance, wet steering stability performance, low rolling resistance, and on-snow performance. The rubber composition for a tire can be suitably used for tread portions of tires for all seasons, and the tire can provide dry steering stability performance, wet steering stability performance, low rolling resistance, and on-snow performance in a compatible manner at a high level.

For the rubber composition for a tire, the storage elastic modulus E' at −10° C. is preferably 45 MPa or less, which allows on-snow performance to be further enhanced.

In the rubber composition for a tire, the inorganic filler is preferably blended at 95 parts by mass or less, which allows low rolling resistance to be further enhanced.

The rubber composition for a tire contains carbon black and silica, and the ratio by mass (Ms/Mc) of the blended amount of the silica (Ms) to the blended amount (Mc) of the carbon black is preferably from 2.5 to 19, which allows the balance among dry steering stability performance, wet steering stability performance, low rolling resistance, and on-snow performance to be further enhanced.

In the tire according to an embodiment of the present technology, the center land portion, the intermediate land portions, and the shoulder land portions each are provided with the plurality of sipes arranged at intervals in a tire circumferential direction, the sipes of the center land portion each have the widened portion formed with a large groove width at one end thereof, and the sipes of the shoulder land portion each extend from the outer side of the ground contact end in a tire width direction toward the outer main groove. Therefore, on-snow performance (particularly steering stability performance on snow-covered road surfaces) can be improved while efficiently increasing edge components. Additionally, since the orientation of the sipes in the center land portion and the shoulder land portions with respect to the tire circumferential direction is opposite to the orientation of the sipes in the intermediate land portions, the sipes in the land portions appropriately act on the ground contact leading edge, and thus can improve on-snow performance. Use of the rubber composition for a tire described above in such a tire can not only provide dry steering stability performance, wet steering stability performance, on-snow performance, and low rolling performance in a compatible manner because of the physical properties of the rubber composition, but also further improve the performance due to the characteristics of the tread pattern.

DETAILED DESCRIPTION

Figure 1:
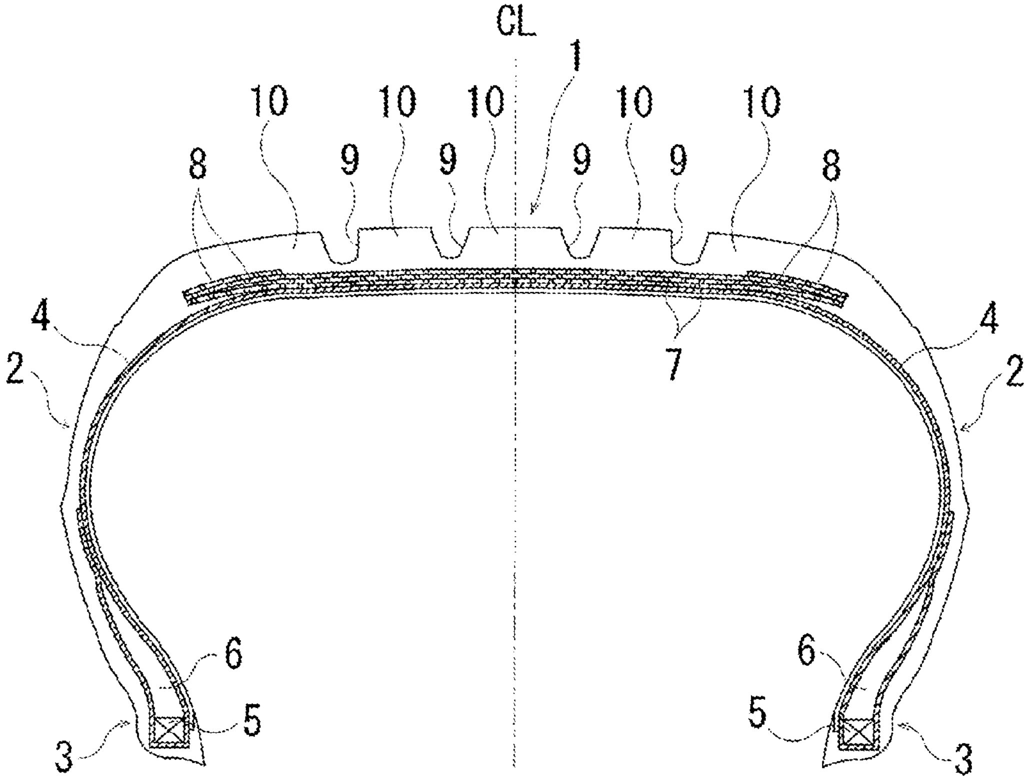
FIG. 1 is a meridian cross-sectional view illustrating a pneumatic tire according to an embodiment of the present technology.

A rubber composition for a tire according to an embodiment of the present technology includes, as a diene rubber, a natural rubber, a styrene-butadiene rubber, and a butadiene rubber, and the total amount of these rubbers is 100% by mass of the diene rubber.

The natural rubber is not particularly limited as long as the natural rubber is typically used for a rubber composition for a tire. The natural rubber allows on-snow performance to be further enhanced. Of 100% by mass of the diene rubber, the natural rubber content is from 20 to 45% by mass and preferably from 25 to 40% by mass. When the natural rubber content is less than 20% by mass, on-snow performance fails to be sufficiently improved. When the natural rubber content is greater than 45% by mass, wet steering stability performance fails to be sufficiently improved.

The butadiene rubber is not particularly limited as long as the butadiene rubber is typically used for a rubber composition for a tire, and may be either an unmodified butadiene rubber or a modified butadiene rubber. Since the butadiene rubber has a low glass transition temperature, the butadiene rubber can enhance on-snow performance by being blended in a rubber composition for a tire. However, when the butadiene rubber is blended, the dispersibility of an inorganic filler containing silica may be deteriorated, and consequently, sufficient enhancement of dry steering stability performance, wet steering stability performance, and low rolling resistance may not be achieved. Meanwhile, by employing the configuration according to an embodiment of the present technology, dispersibility of an inorganic filler containing silica can be made excellent even in the presence of butadiene rubber and an excellent balance of dry steering stability performance, wet steering stability performance, low rolling resistance, and on-snow performance can be achieved.

Of 100% by mass of the diene rubber, the butadiene rubber content is from 20 to 45% by mass and preferably from 25 to 40% by mass. When the butadiene rubber content is less than 20% by mass, on-snow performance is deteriorated. In addition, the storage elastic modulus E' at −10° C. is excessively large. When the butadiene rubber content is greater than 45% by mass, wet steering stability performance is deteriorated.

The styrene-butadiene rubber may be either a terminally modified styrene-butadiene rubber or an unmodified styrene-butadiene rubber. Preferably, a modified styrene-butadiene rubber is employed, which allows wet steering stability performance and on-snow performance to be further enhanced.

Of 100% by mass of the diene rubber, the styrene-butadiene rubber content is from 20 to 45% by mass, preferably from 25 to 40% by mass. When the styrene-butadiene rubber content is less than 20% by mass, wet steering stability performance is deteriorated. When the styrene-butadiene rubber content is greater than 45% by mass, on-snow performance fails to be sufficiently improved.

The type of the modified group of a preferred modified styrene-butadiene rubber is not particularly limited, and examples thereof include an epoxy group, carboxy group, amino group, hydroxy group, alkoxy group, silyl group, aminosilyl group, glycidyl group, alkoxysilyl group, amide group, oxysilyl group, silanol group, isocyanate group, isothiocyanate group, carbonyl group, and aldehyde group. An alkoxysilyl group, amino group, hydroxy group, alkoxy group, silyl group, aminosilyl group, and glycidyl group are preferred, for example.

The rubber composition for a tire contains an inorganic filler. Examples of the inorganic filler include silica and carbon black. Containing the inorganic filler allows the rubber hardness of the rubber composition to be increased, and allows steering stability to be enhanced when the rubber composition is formed into a tire. The inorganic filler is contained at from 80 to 100 parts by mass, preferably 95 parts by mass or less, and more preferably from 83 to 94 parts by mass with respect to 100 parts by mass of the diene rubber. When the inorganic filler content is less than 80 parts by mass, rubber hardness is decreased, and dry steering stability performance and wet steering stability performance fails to be sufficiently improved. When the inorganic filler content is greater than 100 parts by mass, rolling resistance is increased, and on-snow performance is degraded. In addition, the storage elastic modulus E' at −10° C. is excessively large. Furthermore, rolling resistance can be further reduced by adjusting the inorganic filler content to 95 parts by mass or less.

The inorganic filler can contain silica and carbon black. Containing silica and carbon black allows rubber hardness to be increased, and allows rolling resistance to be reduced. The total (Ms+Mc) of the blended amount (Ms) of the silica and the blended amount (Mc) of the carbon black is preferably from 80 to 100 parts by mass, more preferably 95 parts by mass or less, and even more preferably from 83 to 94 parts by mass with respect to 100 parts by mass of the diene rubber. Furthermore, the ratio by mass (Ms/Mc) of the blended amount (Ms) of the silica to the blended amount (Mc) of the carbon black is preferably from 2.5 to 19 and more preferably from 3.0 to 18. When the ratio by mass (Ms/Mc) is less than 2.5, rolling resistance fails to be sufficiently reduced. When the ratio by mass is greater than 19, dry steering stability performance fails to be sufficiently improved.

Examples of the silica include wet silica (hydrous silicic acid), dry silica (silicic anhydride), calcium silicate, and aluminum silicate. One type of these can be used alone, or a combination of two or more types of these can be used. Furthermore, surface-treated silica, in which the surface of silica is surface-treated by a silane coupling agent, may be also used.

The CTAB (cetyltrimethylammonium bromide) adsorption specific surface area of the silica is not particularly limited, and is preferably from 140 to 300 $m^2/g$, and more preferably from 160 to 260 $m^2/g$. By setting the CTAB adsorption specific surface area of silica to 140 $m^2/g$ or greater, the wet steering stability performance of the rubber composition can be ensured. Furthermore, by setting the CTAB adsorption specific surface area of silica to 300 $m^2/g$ or less, excellent dry steering stability performance, wet steering stability performance, and low rolling resistance can be achieved. In the present specification, the CTAB adsorption specific surface area of silica is a value measured in accordance with ISO (International Organization for Standardization) 5794.

The carbon black preferably has a nitrogen adsorption specific surface area ($N_2SA$) of from 50 to 180 $m^2/g$ and more preferably from 70 to 160 $m^2/g$. When the nitrogen adsorption specific surface area of the carbon black is less than 50 $m^2/g$, dry steering stability performance fails to be improved. When the nitrogen adsorption specific surface area of the carbon black is greater than 180 $m^2/g$, rolling resistance fails to be sufficiently reduced. In this specification, the nitrogen adsorption specific surface area of the carbon black is a value measured in accordance with JIS (Japanese Industrial Standard) K6217-2.

The rubber composition for a tire can contain other fillers besides the silica and the carbon black. Examples of the other fillers include calcium carbonate, magnesium carbonate, talc, clay, alumina, aluminum hydroxide, titanium oxide, and calcium sulfate. One type of these other fillers can be used alone, or a combination of two or more types of these can be used.

The rubber composition for a tire preferably contains a silane coupling agent along with the silica. The silane coupling agent can improve the dispersibility of the silica. The blended amount of the silane coupling agent is preferably from 4 to 16% by mass and more preferably from 5 to 15% by mass, based on the mass of the silica. When the blended amount of the silane coupling agent is less than 4% by mass, the dispersibility of the silica may fail to be sufficiently enhanced. When the blended amount of the silane coupling agent is greater than 20% by mass, the rubber composition may be likely to cause early vulcanization, and forming processability may be deteriorated.

The silane coupling agent is not particularly limited as long as the silane coupling agent can be used for a rubber composition for a tire. Examples thereof include sulfur-containing silane coupling agents such as bis(3-triethoxysilylpropyl)tetrasulfide, bis(3-triethoxysilylpropyl)disulfide, 3-trimethoxysilylpropyl benzothiazole tetrasulfide, γ-mercaptopropyl triethoxysilane, and 3-octanoylthiopropyl triethoxysilane. Among these, a silane coupling agent having a mercapto group is preferred, which is capable of increasing affinity for silica and improving the dispersibility thereof. One type of these silane coupling agents can be blended alone, or a combination of multiple types of these can be blended.

Additionally, the rubber composition for a tire, blended with an alkylsilane having an alkyl group with from 3 to 20 carbons, is capable of promoting the dispersion of the silica and improving wet performance and performance on ice and snow. The alkyl silane is preferably an alkyltriethoxysilane having an alkyl group with from 7 to 20 carbons. Examples of the alkyl group having from 7 to 20 carbons include a heptyl group, octyl group, nonyl group, decyl group, undecyl group, dodecyl group, tridecyl group, tetradecyl group, pentadecyl group, hexadecyl group, heptadecyl group, octadecyl group, nonadecyl group, and icosyl group. Among these, from the perspective of miscibility with the diene rubber, an alkyl group having from 8 to 10 carbons is preferable, and an octyl group or nonyl group is even more preferable.

The blended amount of the alkylsilane is preferably from 1 to 20 mass % and more preferably from 2 to 15 mass %, based on the mass of the silica.

The storage elastic modulus E' of the rubber composition for a tire at −10° C. is preferably 45 MPa or less and more preferably from 25 to 43 MPa. Adjusting the storage elastic modulus E' at −10° C. to 45 MPa or less allows on-snow performance to be further enhanced. In the present specification, the storage elastic modulus E' at −10° C. is a value measured under the conditions of an elongation deformation strain of 10±2%, a frequency of 20 Hz, and −10° C. with the use of a viscoelasticity spectrometer.

The rubber composition for a tire may further contain various additives that are commonly used in the rubber composition for a tire within a range that does not impair the object of the present technology. Examples thereof include a vulcanization or crosslinking agent, a vulcanization accelerator, an anti-aging agent, a plasticizer, a processing aid, a liquid polymer, a terpene resin, and a thermosetting resin. These additives may be kneaded by any commonly known method to form a rubber composition, and can be used for vulcanization or crosslinking. Blended amounts of these additives may be any typical amount, so long as the objects of the present technology are not hindered.

The rubber composition for a tire is suitably used for forming, for example, a tread portion or a side portion of a tire, and can be formed into all-season tires that have an excellent balance of dry steering stability performance, wet steering stability performance, low rolling resistance, and on-snow performance to a high degree.

Figure 2:
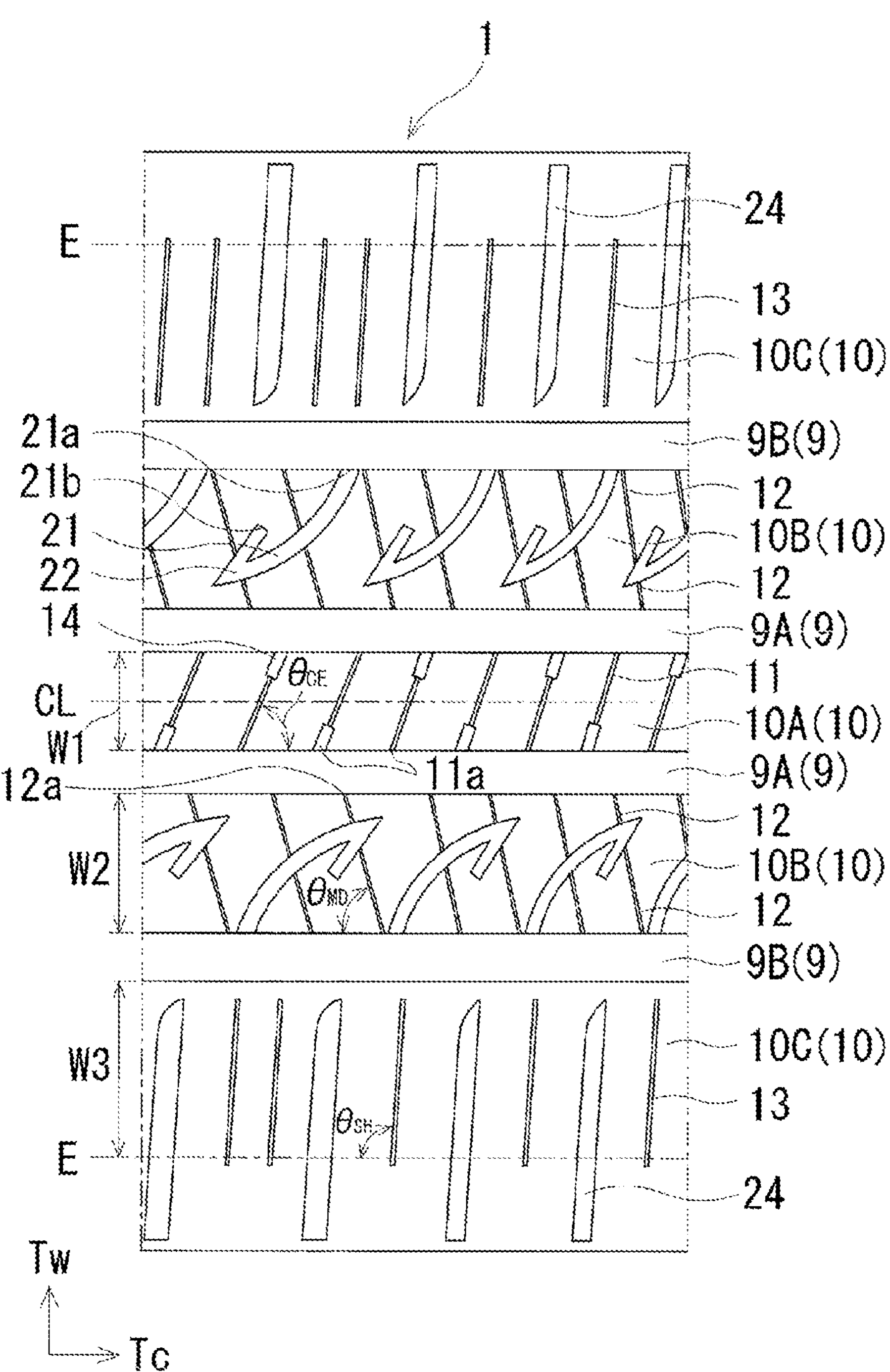
FIG. 2 is a plan view illustrating an example of a tread portion of a pneumatic tire according to the embodiment of the present technology.
Figure 3:
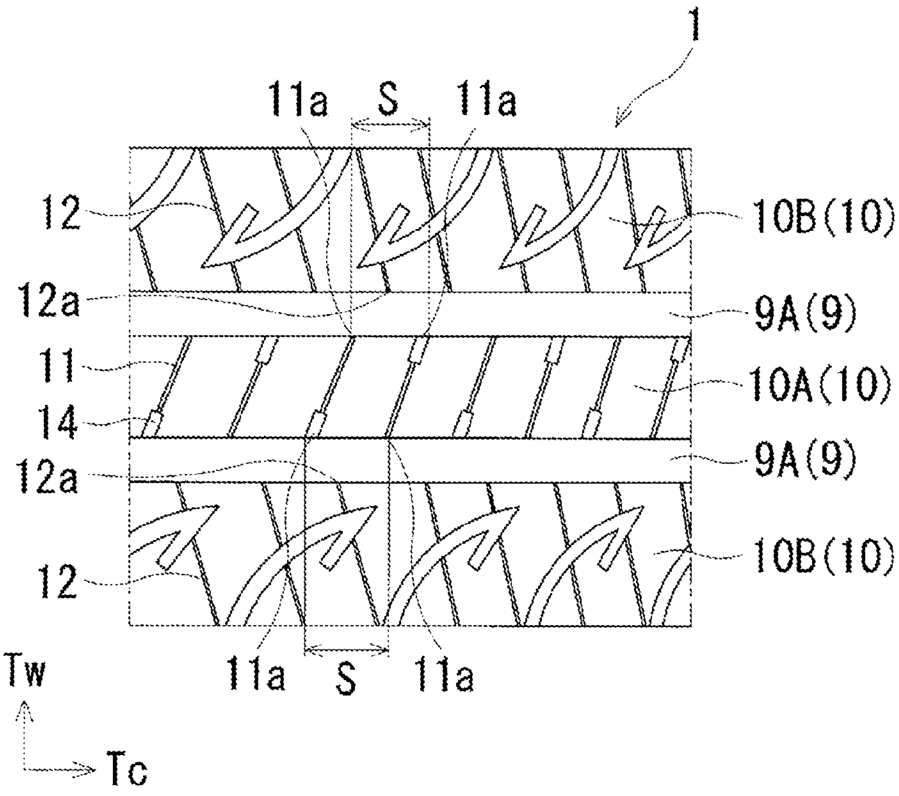
FIG. 3 is an enlarged plan view illustrating a center land portion and an intermediate land portion of the tread portion in FIG. 2.

Preferred tire configurations will be described in detail below with reference to the accompanying drawings. The tire according to an embodiment of the present technology is preferably a pneumatic tire. FIGS. 1 to 3 illustrate a pneumatic tire according to an embodiment of the present technology. In FIGS. 2 and 3, Tc indicates the tire circumferential direction and Tw indicates the tire width direction.

As illustrated in FIG. 1, the pneumatic tire according to an embodiment of the present technology includes an annular tread portion 1 extending in the tire circumferential direction, a pair of sidewall portions 2, 2 respectively disposed on both sides of the tread portion 1, and a pair of bead portions 3, 3 each disposed on an inner side of the sidewall portions 2 in a tire radial direction.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on the outer circumference of the bead core 5.

On the other hand, a plurality of belt layers 7 are embedded on the outer circumferential side of the carcass layer 4 in the tread portion 1. Each of the belt layers 7 includes a plurality of reinforcing cords that are inclined with respect to the tire circumferential direction, and the reinforcing cords are disposed so as to intersect each other between the layers. In the belt layers 7, the inclination angle of the reinforcing cords with respect to the tire circumferential direction is set to fall within a range of from 10° to 40°, for example. Steel cords are preferably used as the reinforcing cords of the belt layers 7. To improve high-speed durability, at least one belt cover layer 8, formed by disposing reinforcing cords at an angle of, for example, 5° or less with respect to the tire circumferential direction, is disposed on an outer circumferential side of the belt layers 7. Organic fiber cords such as nylon and aramid are preferably used as the reinforcing cords of the belt cover layer 8.

Note that the tire internal structure described above represents a typical example for a pneumatic tire, but the pneumatic tire is not limited thereto.

As illustrated in FIG. 2, four main grooves 9 extending in the tire circumferential direction are formed in the tread portion 1. The main grooves 9 include a pair of inner main grooves 9A, 9A located on both sides of the tire center line CL and a pair of outer main grooves 9B, 9B located on the outermost side in the tire width direction. The tread portion 1 is divided into land portions 10 by the four main grooves 9. The land portions 10 include a center land portion 10A located on the tire center line CL, a pair of intermediate land portions 10B, 10B located outward of the center land portion 10A in the tire width direction, and a pair of shoulder land portions 10C, 10C located outward of the intermediate land portions 10B, 10B in the tire width direction.

The center land portion 10A, the intermediate land portions 10B, and the shoulder land portions 10C each are provided with a plurality of sipes 11, 12, and 13, respectively, at intervals in the tire circumferential direction. Further, the intermediate land portions 10B and the shoulder land portions 10C each are provided with a plurality of lug grooves 21, 24 inclined with respect to the tire circumferential direction, respectively, at intervals in the tire circumferential direction.

Both ends of the sipes 11 in the center land portion 10A communicate with the pair of inner main grooves 9A, 9A. That is, the sipe 11 is an open sipe. The sipe 11 has a single widened portion 14 formed with a large groove width to increase edge components. The widened portion 14 is disposed on one side of the sipe 11, and the sipe 11 communicates with the inner main groove 9A via the widened portion 14. Such sipes 11 are alternately disposed in the tire circumferential direction.

One end of the sipe 12 of the intermediate land portion 10B communicates with the inner main groove 9A, and the other end communicates with the outer main groove 9B. That is, the sipe 12 is an open sipe. The sipe 12 has a structure divided into a plurality of sections by the lug grooves 21, but the divided portions of the same sipe 12 are disposed on the same straight line.

Both ends of the sipe 13 in the shoulder land portion 10C terminate within the shoulder land portion 10C. That is, the sipe 13 is a closed sipe. The sipes 13 extend from the outer side of the ground contact end E in the tire width direction toward the outer main groove 9B, to improve on-snow performance.

The sipes 11 in the center land portion 10A, the sipes 12 in the intermediate land portions 10B, and the sipes 13 in the shoulder land portions 10C are all inclined with respect to the tire circumferential direction. These sipes 11 to 13 are not inclined in the same direction with respect to the tire circumferential direction. In other words, the orientation of the sipes 11 in the center land portion 10A with respect to the tire circumferential direction is the same as the orientation of the sipes 13 in the shoulder land portions 10C, while the orientation of the sipes 12 in the intermediate land portions 10B with respect to the tire circumferential direction is opposite to the orientation of the sipes 11, 13.

An inclination angle of the sipes 11 to 13 with respect to the tire circumferential direction is expressed as $\theta$. Here, an inclination angle $\theta_{CE}$ of the sipes 11 in the center land portion 10A, an inclination angle $\theta_{MD}$ of the sipes 12 in the intermediate land portions 10B, and an inclination angle $\theta_{SH}$ of the sipes 13 in the shoulder land portion 10C can satisfy a relationship $\theta_{CE}<\theta_{MD}<\theta_{SH}<90°$. The sipes 13 in the shoulder land portions 10C are set to be substantially perpendicular to the tire circumferential direction. In particular, preferably, the inclination angle $\theta_{CE}$ ranges from 60° to 75°, the inclination angle $\theta_{MD}$ ranges from 70° to 85°, and the inclination angle $\theta_{SH}$ ranges from 83° to 88°. Alternatively, it is preferred that a ratio of the inclination angle $\theta_{CE}$ to the inclination angle $\theta_{MD}$ ranges from 85% to 95%, and a ratio of the inclination angle $\theta_{MD}$ to the inclination angle $\theta_{SH}$ ranges from 80% to 95%. Note that the inclination angle $\theta$ is an inclination angle on the acute angle side of the sipe with respect to the tire circumferential direction.

As illustrated in FIG. 3, an end 12*a* of each sipe 12 in the intermediate land portion 10B on the side of the inner main groove 9A is preferably disposed between ends 11*a* of the adjacent sipes 11 in the center land portion 10A on the side of the inner main groove 9A in the tire circumferential direction. More specifically, the end 12*a* of each sipe 12 is preferably disposed in a section S in the tire circumferential direction that faces the inner main groove 9A. Additionally, at any position on the entire circumference of the tire, at least one of the sipe 11 in the center land portion 10A and the sipe 12 in the intermediate land portion 10B is preferably present on the tire meridian. In other words, when the tread portion 1 is cut along the tire width direction, the sipes 11 in the center land portion 10A and the sipes 12 in the intermediate land portion 10B are preferably disposed so as to overlap each other in the tire circumferential direction.

In the pneumatic tire described above, the center land portion 10A, the intermediate land portions 10B, and the shoulder land portions 10C each are provided with the plurality of sipes 11 to 13, respectively, arranged at intervals in a tire circumferential direction, the sipes 11 in the center land portion 10A each have the widened portion 14 formed with a large groove width at one end thereof, and the sipes 13 in the shoulder land portions 10C each extend from the outer side of the ground contact end E in the tire width direction toward outer main groove 9B. Therefore, on-snow performance (particularly steering stability performance on snow-covered road surfaces) can be improved while efficiently increasing edge components. Since the orientation of the sipes 11, 13 in the center land portion 10A and the shoulder land portions 10C with respect to the tire circumferential direction is opposite to the orientation of the sipes 12 in the intermediate land portions 10B, the sipes 11 to 13 in the land portions 10A to 10C appropriately act on the ground contact leading edge, and since the inclination angle $\theta_{CE}$ of the sipes 11, the inclination angle $\theta_{MD}$ of the sipes 12, and the inclination angle $\theta_{SH}$ of the sipe 13 satisfy the relationship $\theta_{CE}<\theta_{MD}<\theta_{SH}<90°$, the generation of pattern noise can be suppressed while improving on-snow performance. Additionally, since the end 12*a* of the sipe 12 in the intermediate land portion 10B is disposed between ends 11*a* of the adjacent sipes 11 in the center land portion 10A in the tire circumferential direction, and at any position on the entire circumference of the tire, at least one of the sipe 11 in the center land portion 10A and the sipe 12 in the intermediate land portion 10B is present on the tire meridian, variations in the area of the grooves at the ground contact leading edge can be suppressed, thereby reducing the occurrence of pattern noise.

In FIG. 2, the sipes 13 in the shoulder land portions 10C do not communicate with the outer main groove 9B. With the sipe 13 of such a structure, a decrease in block rigidity in the shoulder land portion 10C can be suppressed, thereby effectively suppressing the occurrence of pattern noise. In contrast, when the sipes 13 in the shoulder land portions 10C communicate with the outer main grooves 9B, block rigidity decreases, which disadvantageously leads to deterioration of pattern noise.

Additionally, a width W1 of the center land portion 10A, a width W2 of the intermediate land portion 10B, and a width W3 of the shoulder land portion 10C in the ground contact region satisfy a relationship W1<W2<W3. By setting the widths W1 to W3 of the land portions 10A to 10C so as to satisfy such a relationship, edge components contributing to the improvement of snow braking and snow traction can be increased, effectively improving on-snow performance. Specifically, the width W3 of the shoulder land portion 10C in the ground contact region is the width from the end of the shoulder land portion 10C on the side of the outer main groove 9B to the ground contact end E.

Further, one end 21*a* of the lug groove 21 in the intermediate land portion 10B opens to the outer main groove 9B, while the other end 21*b* terminates in the intermediate land portion 10B. The lug grooves 21 each intersect the sipe 12, and are disposed so as not to overlap each other in the tire circumferential direction. In particular, in order to improve on-snow performance, the lug groove 21 may preferably intersect the plurality of sipes 12. The lug groove 21 includes an acute bent portion 22 formed at a position between the one end 21*a* and the other end 21*b*. On the other hand, the lug grooves 24 in the shoulder land portions 10C do not communicate with the outer main grooves 9B. The lug grooves 24 in the shoulder land portions 10C extend from the outer side of the ground contact end E in the tire width direction toward the outer main groove 9B.

As described above, since the intermediate land portion 10B includes the plurality of lug grooves 21 extending in the tire circumferential direction while intersecting the sipe 12 in the intermediate land portion 10B, on-snow performance can be improved, and variations in the area of the grooves at the ground contact leading edge can be reduced. Additionally, the one end 21*a* of the lug groove 21 opens to the outer main groove 9B, while the other end 21*b* terminates in the intermediate land portion 10B. Thus, the occurrence of pattern noise can be suppressed. Further, since each of the lug grooves 21 in the intermediate land portion 10B has the acute bent portion 22, edge components can be increased to effectively suppress on-snow performance.

In the above-mentioned embodiments of FIGS. 2 and 3, the sipes 11 in the center land portion 10A and the sipes 12 in the intermediate land portions 10B each are an open sipe with both ends that communicate with the main grooves 9 and however, may be a semi-closed sipe with one end that does not communicate with the main groove 9, or a closed-sipe with both ends that do not communicate with the main groove 9.

Although the lug grooves 24 do not communicate with the outer main grooves 9B in the above-mentioned embodiment in FIG. 2, the lug grooves 24 may communicate with the outer main groove 9B via another sipe. In this case, another sipe is a sipe extending along the tire width direction between an end of the lug groove 24 on the side of the outer main groove 9B and the outer main groove 9B.

Embodiments according to the present technology are further described below by Examples. However, the scope of the present technology is not limited to these Examples.

Examples

Each of nineteen types of rubber compositions for a tire (Examples 1 to 8, Standard Example, and Comparative Examples 1 to 10) was prepared according to the formulations shown in Tables 1 and 2 with the compounding agents shown in Table 3 used as common components. With the exception of the sulfur and the vulcanization accelerators, the components were kneaded in a 1.7 L sealed Banbury mixer for 5 minutes, then discharged from the mixer, and cooled at room temperature. This was placed in the 1.7 L sealed Banbury mixer, and the sulfur and the vulcanization accelerators were then added and mixed, and thus a rubber composition for a tire was prepared. Note that, in the rows of "Styrene-butadiene rubber (SBR)" in Tables 1 and 2, the net blended amount, except the amount of the oil-extending component, of SBR is written in parentheses in addition to the blended amount of the product. Furthermore, the blended amounts of the compounding agents shown in Table 3 are expressed as values in part by mass per 100 parts by mass of the diene rubbers shown in Tables 1 and 2.

Test pieces were prepared by subjecting the obtained rubber compositions for a tire to press vulcanization at 160° C. for 20 minutes by using a predetermined mold, the rubber hardness at 23° C. and the storage elastic modulus E' at −10° C. were measured by the following test methods, and are shown in Tables 1 and 2.

Rubber hardness at 23° C.

The rubber hardness of the test pieces was measured in accordance with JIS K6253 using a type A durometer at 23° C.

Storage elastic modulus E' at −10° C.

The dynamic viscoelasticity of the obtained test pieces was measured using a viscoelasticity spectrometer available from Iwamoto Seisakusho at an elongation deformation strain of 10%±2%, a frequency of 20 Hz, and a temperature of −10° C., and the storage elastic modulus E' (−10° C.) was measured.

Nineteen types of all-season tires, in which the rubber composition for a tire obtained as described above was used in a tread rubber (tire size: 195/65R15), were vulcanization-molded, and dry steering stability performance, wet steering stability performance, on-snow performance, and rolling resistance were measured by the following test methods. In the all-season tires described above, with tread patterns thereof each provided with four main grooves containing a pair of inner main grooves and a pair of outer main grooves that extend in the tire circumferential direction, the main grooves defining a center land portion, a pair of intermediate land portions located outward of the center land portion, and a pair of shoulder land portions located outward of the intermediate land portions, the center land portion, the intermediate land portions, and the shoulder land portions were each provided with a plurality of sipes arranged at intervals in the tire circumferential direction, the sipes in the center land portion each included a widened portion formed with a large groove width at one end, the sipes in the shoulder land portions each extended from an outer side of a ground contact end in a tire width direction toward the outer main groove, the orientation of the sipes in the center land portion and the shoulder land portions with respect to the tire circumferential direction was opposite to the orientation of the sipes in the intermediate land portions, an inclination angle $\theta_{CE}$ of the sipes in the center land portion with respect to the tire circumferential direction, an inclination angle $\theta_{MD}$ of the sipes in the intermediate land portions with respect to the tire circumferential direction, and an inclination angle $\theta_{SH}$ of the sipes in the shoulder land portion with respect to the tire circumferential direction satisfies a relationship $\theta_{CE}<\theta_{MD}<\theta_{SH}<90°$, an end of the sipe in the intermediate land portion on the side of the inner main groove was disposed between ends of the adjacent sipes in the center land portion in the tire circumferential direction, and at any position on the entire circumference of the tire, at least one of the sipe in the center land portion and the sipe in the intermediate land portion was present on a tire meridian.

Dry Steering Stability Performance

The tire obtained as described above was mounted on a standard rim, inflated to an air pressure of 250 kPa, and mounted on a test vehicle. The test vehicle traveled on a dry road surface with relatively less protrusions and recesses, and the responsiveness of steering was subjected to sensory evaluation from scale 1 to scale 5, and listed in the columns "Dry steering stability performance" of Tables 1 and 2. Larger index values indicate better dry steering stability performance, and the scale 3 is regarded as a passing level.

Wet Steering Stability Performance

The tire obtained as described above was mounted on a standard rim, inflated to an air pressure of 250 kPa, and mounted on a test vehicle. The test vehicle traveled on a wet road surface with relatively less protrusions and recesses, and the responsiveness of steering was subjected to sensory evaluation from scale 1 to scale 5, and listed in the columns "Wet steering stability performance" of Tables 1 and 2. Larger index values indicate better wet steering stability performance, and the scale 3 is regarded as a passing level.

On-Snow Performance

The tire obtained as described above was mounted on a standard rim, inflated to an air pressure of 250 kPa, and mounted on a test vehicle. The test vehicle traveled on a compacted-snow road surface, and the responsiveness of steering was subjected to sensory evaluation from scale 1 to scale 5, and listed in the columns "On-snow performance" of Tables 1 and 2. Larger index values indicate better on-snow performance, and the scale 3 is regarded as a passing level.

Rolling Resistance

The tire obtained as described above was mounted on a standard rim, inflated to an air pressure of 210 kPa, and mounted on an indoor drum testing machine with a drum diameter of 1707 mm conforming to JIS D 4230, and the resistance was measured under a test load of 4.82 kN at a speed of 80 km/hour, as the rolling resistance. The obtained results are shown in rows of "Rolling resistance" in Tables 1 and 2 with Standard Example being assigned the value of 100. A smaller index value indicates a lower rolling resistance, and the index value of 98 or less indicates excellent low rolling resistance.

TABLE 1-1

| | | Standard | Examples | | | |
|---|---|---|---|---|---|---|
| | | Example | 1 | 2 | 3 | 4 |
| NR | Part by mass | 30 | 30 | 25 | 30 | 25 |
| SBR | Part by mass | 48 (35) | 48 (35) | 55 (40) | 55 (40) | 48 (35) |
| BR | Part by mass | 35 | 35 | 35 | 25 | 40 |
| Carbon black (Mc) | Part by mass | 10 | 10 | 10 | 10 | 10 |
| Silica (Ms) | Part by mass | 65 | 80 | 80 | 80 | 80 |
| Silane coupling agent | Part by mass | 6.5 | 8.0 | 8.0 | 8.0 | 8.0 |
| Alkylsilane | Part by mass | | 2.0 | 2.0 | 2.0 | 2.0 |
| Aroma oil | Part by mass | 10.0 | 10.0 | 8.1 | 8.1 | 10.0 |
| Inorganic filler (Ms + Mc) (parts by mass) | | (75) | (90) | (90) | (90) | (90) |
| Ratio by mass (Ms/Mc) | — | 6.5 | 8.0 | 8.0 | 8.0 | 8.0 |
| Rubber hardness (23° C.) | — | 65 | 70 | 70 | 70 | 70 |
| E' (−10° C.) | MPa | 29 | 37 | 40 | 42 | 25 |
| Dry steering stability | Index value | 3 | 4 | 4 | 4 | 4 |
| Wet steering stability | Index value | 3 | 4 | 5 | 5 | 4 |
| On-snow performance | Index value | 3 | 4 | 4 | 4 | 5 |
| Rolling resistance | Index value | 100 | 95 | 92 | 98 | 93 |

TABLE 1-2

| | | Examples | | | |
|---|---|---|---|---|---|
| | | 5 | 6 | 7 | 8 |
| NR | Part by mass | 40 | 30 | 30 | 30 |
| SBR | Part by mass | 48 (35) | 48 (35) | 48 (35) | 48 (35) |
| BR | Part by mass | 25 | 35 | 35 | 35 |
| Carbon black (Mc) | Part by mass | 10 | 10 | 10 | 10 |
| Silica (Ms) | Part by mass | 80 | 85 | 75 | 88 |
| Silane coupling agent | Part by mass | 8.0 | 8.5 | 7.5 | 8.8 |
| Alkylsilane | Part by mass | 2.0 | 2.0 | 2.0 | 2.0 |
| Aroma oil | Part by mass | 10.0 | 10.0 | 10.0 | 10.0 |
| Inorganic filler (Ms + Mc) (parts by mass) | | (90) | (95) | (85) | (98) |
| Ratio by mass (Ms/Mc) | — | 8.0 | 8.5 | 7.5 | 8.8 |
| Rubber hardness (23° C.) | — | 70 | 72 | 68 | 73 |
| E' (−10° C.) | MPa | 39 | 43 | 35 | 44 |
| Dry steering stability | Index value | 4 | 5 | 4 | 5 |
| Wet steering stability | Index value | 5 | 5 | 4 | 5 |
| On-snow performance | Index value | 4 | 4 | 5 | 4 |
| Rolling resistance | Index value | 97 | 97 | 90 | 98 |

TABLE 2-1

| | | Comparative Example | | | | |
|---|---|---|---|---|---|---|
| | | 1 | 2 | 3 | 4 | 5 |
| NR | Part by mass | 30 | 30 | 35 | 30 | 35 |
| SBR | Part by mass | 48 (35) | 69 (50) | 21 (15) | 28 (20) | 55 (40) |
| BR | Part by mass | 35 | 20 | 40 | 50 | 15 |
| Carbon black (Mc) | Part by mass | 10 | 10 | 10 | 10 | 10 |
| Silica (Ms) | Part by mass | 80 | 80 | 80 | 80 | 80 |
| Silane coupling agent | Part by mass | 8.0 | 8.0 | 8.0 | 8.0 | 8.0 |
| Alkylsilane | Part by mass | | 2.0 | 2.0 | 2.0 | 2.0 |
| Aroma oil | Part by mass | 10.0 | 4.4 | 17.5 | 15.6 | 8.1 |
| Inorganic filler (Ms + Mc) | (parts by mass) | (90) | (90) | (90) | (90) | (90) |
| Ratio by mass (Ms/Mc) | — | 8.0 | 8.0 | 8.0 | 8.0 | 8.0 |
| Rubber hardness (23° C.) | — | 75 | 70 | 70 | 70 | 70 |
| E' (−10° C.) | MPa | 53 | 50 | 20 | 18 | 48 |
| Dry steering stability | Index value | 5 | 4 | 4 | 4 | 4 |
| Wet steering stability | Index value | 4 | 5 | 2 | 2 | 5 |
| On-snow performance | Index value | 2 | 2.5 | 5 | 5 | 2 |
| Rolling resistance | Index value | 108 | 90 | 102 | 101 | 88 |

TABLE 2-2

| | | Comparative Example | | | | |
|---|---|---|---|---|---|---|
| | | 6 | 7 | 8 | 9 | 10 |
| NR | Part by mass | 50 | 15 | 30 | 30 | 30 |
| SBR | Part by mass | 28 (20) | 55 (45) | 48 (35) | 48 (35) | 48 (35) |
| BR | Part by mass | 30 | 40 | 35 | 35 | 35 |
| Carbon black (Mc) | Part by mass | 10 | 10 | 10 | 10 | 10 |
| Silica (Ms) | Part by mass | 80 | 80 | 80 | 95 | 60 |
| Silane coupling agent | Part by mass | 8.0 | 8.0 | 8.0 | 9.5 | 6.0 |
| Alkylsilane | Part by mass | 2.0 | 2.0 | 2.0 | 2.0 | 2.0 |
| Aroma oil | Part by mass | 15.6 | 6.2 | 20.0 | 10.0 | 10.0 |
| Inorganic filler (Ms + Mc) | (parts by mass) | (90) | (90) | (90) | (105) | (70) |
| Ratio by mass (Ms/Mc) | — | 8.0 | 8.0 | 8.0 | 9.5 | 6.0 |
| Rubber hardness (23° C.) | — | 70 | 70 | 65 | 76 | 66 |
| E' (−10° C.) | MPa | 38 | 46 | 29 | 55 | 30 |
| Dry steering stability | Index value | 4 | 4 | 2.5 | 5 | 2.5 |
| Wet steering stability | Index value | 2 | 4 | 3 | 5 | 2.5 |
| On-snow performance | Index value | 5 | 2 | 5 | 2 | 5 |
| Rolling resistance | Index value | 100 | 87 | 95 | 105 | 85 |

TABLE 3

| Common formulation of rubber compositions | |
|---|---|
| Zinc oxide | 2.0 Part by mass |
| Stearic acid | 1.0 Part by mass |
| Anti-aging agent-1 | 3.0 Part by mass |
| Anti-aging agent-2 | 2.0 Part by mass |
| Sulfur | 2.0 Part by mass |
| Vulcanization accelerator-1 | 2.0 Part by mass |
| Vulcanization accelerator-1 | 1.0 Part by mass |

For Table 3, the types of the used raw materials are as follows.

NR: Natural rubber, STR 20

SBR: Modified styrene butadiene rubber, TUFDENE E581, available from Asahi Kasei Corporation, styrene content: 36%, 37.5 parts by mass of oil extended product in 100 parts by mass of rubber BR: Butadiene rubber, UBEPOL BR150, available from Thai Synthetic Rubbers Co., Ltd.

Carbon black: N-134, available from Thai Tokai Carbon, nitrogen adsorption specific surface area is 142 $m^2$ Silica: ULTRASIL 7000 GR, available from Evonik, CTAB adsorption specific surface area is 158 $m^2/g$ Silane coupling agent: Sulfide-based silane coupling agent, Si69, available from Evonik Degussa, bis(triethoxysilylpropyl)tetrasulfide Alkylsilane: KBE-3083, available from Shin-Etsu Chemical Co., Ltd., octyltriethoxysilane Aroma oil: VivaTec 500, available from H&R Chemical Zinc oxide: Zinc Oxide III, available from Seido Chemical Industry Co., Ltd.

Stearic acid: beads stearic acid, available from NOF Corporation

Anti-aging agent-1: Santoflex 6PPD, available from Solutia Europe

Anti-aging agent-2: Pilnox TDQ, available from Nocil Limited

Sulfur: Golden Flower oil treated sulfur powder (sulfur content: 95.24 mass %), available from Tsurumi Chemical Industry Co., Ltd.

Vulcanization accelerator-1: NOCCELER CZ-G (CZ), available from Ouchi Shinko Chemical Industrial Co., Ltd.

Vulcanization accelerator-2: Soxinol D-G (DPG), available from Sumitomo Chemical Co., Ltd.

As can be seen from Tables 1 and 2, it was confirmed that the tire obtained from each of the rubber compositions according to Examples 1 to 8 achieved excellent dry steering stability performance, wet steering stability performance, on-snow performance, and low rolling resistance.

The rubber composition for a tire obtained according to Comparative Example 1, because of containing no alkylsilane, is high in the rolling resistance of the tire and inferior in the on-snow performance thereof.

The rubber composition for a tire according to Comparative Example 2 is inferior in the on-snow performance of the tire because the net content of the SBR is greater than 45 parts by mass.

The rubber composition for a tire according to Comparative Example 3 is high in the rolling resistance of the tire and inferior in the wet steering stability performance thereof because the net content of the SBR is less than 20 parts by mass.

The rubber composition for a tire according to Comparative Example 4 is inferior in the wet steering stability performance of the tire because the content of the butadiene rubber is greater than 45 parts by mass. Furthermore, the rolling resistance fails to be sufficiently reduced.

The rubber composition for a tire according to Comparative Example 5 is inferior in the on-snow performance of the tire because the content of the butadiene rubber is less than 20 parts by mass.

The rubber composition for a tire according to Comparative Example 6 is inferior in the wet steering stability performance of the tire, and fails to sufficiently improve the rolling resistance thereof because the content of the natural rubber is greater than 45 parts by mass.

The rubber composition for a tire according to Comparative Example 7 is inferior in the on-snow performance of the tire because the content of the natural rubber is less than 20 parts by mass.

The rubber composition for a tire according to Comparative Example 8 is inferior in the dry steering stability performance of the tire because the rubber hardness is less than 68.

The rubber composition for a tire according to Comparative Example 9 is high in the rolling resistance of the tire and inferior in the on-snow performance thereof because the inorganic filler is greater than 100 parts by mass.

The rubber composition for a tire according to Comparative Example 10 fails to sufficiently improve the dry steering stability performance and wet steering stability performance of the tire because of the inorganic filler of less than 80 parts by mass and the rubber hardness of less than 68.

The invention claimed is:

1. A rubber composition for a tire, obtained by blending a reinforcing filler comprising silica and carbon black, from not less than 0.5 to less than 5.0 parts by mass of an alkylsilane having an alkyl group with from 7 to 20 carbons in 100 parts by mass of a diene rubber including from 20 to 45% by mass of a natural rubber, from 20 to 45% by mass of a styrene-butadiene rubber, and from 20 to 45% by mass of a butadiene rubber that add up to a total of 100% by mass and a sulfur-containing silane coupling agent in an amount of from 4% to 16% by mass of the silica, a rubber hardness of the rubber composition at 23° C. being 68 or more, and the natural rubber being an unmodified natural rubber; wherein a total oil content in the rubber composition is less than a content of the natural rubber, a blended amount (Ms) of the silica is from 82 to 95 parts by mass with respect to the 100 parts by mass of the diene rubber, and a ratio by mass (Ms/Mc) of the blended amount (Ms) of the silica to a blended amount (Mc) of the carbon black is from 7.5 to 19, and a total (Ms+Mc) of the blended amount (Ms) of the silica and the blended amount (Mc) of the carbon black is from 86 to 100 parts by mass with respect to the 100 parts by mass of the diene rubber.

2. The rubber composition for a tire according to claim 1, wherein a storage elastic modulus E' of the rubber composition at −10° C. is 45 MPa or less.

3. The rubber composition for a tire according to claim 1, wherein the reinforcing filler is blended at from 86 parts by mass or more to 95 parts by mass or less.

4. The rubber composition for a tire according to claim 1, wherein the rubber composition is obtained by blending from not less than 0.5 to not more than 4.0 parts by mass of the alkylsilane having the alkyl group.

5. A tire comprising a tread portion formed from the rubber composition for a tire described in claim 1, the tread portion being provided with four main grooves comprising a pair of inner main grooves and a pair of outer main grooves that extend in the tire circumferential direction, the main grooves defining a center land portion, a pair of intermediate land portions located outward of the center land portion, and a pair of shoulder land portions located outward of the intermediate land portions, wherein the center land portion, the intermediate land portions, and the shoulder land portions are each provided with a plurality of sipes arranged at intervals in the tire circumferential direction, the sipes in the center land portion have a widened portion formed with a large groove width at one end, the sipes in the shoulder land portions extend from an outer side of a ground contact end in a tire width direction toward the outer main groove, and an orientation of the sipes in the center land portion and the shoulder land portions with respect to the tire circumferential direction is opposite to orientation of the sipes in the intermediate land portions.

* * * * *